United States Patent

Wecke et al.

[11] Patent Number: 5,361,925
[45] Date of Patent: Nov. 8, 1994

[54] TERMINAL BOX

[75] Inventors: Rolf Wecke, Bückeburg; Jürgen Weiss, Lübbecke, both of Germany

[73] Assignee: Bernstein Compact Gehäuse Gmbh, Germany

[21] Appl. No.: 931,293

[22] Filed: Sep. 17, 1992

[30] Foreign Application Priority Data

Aug. 19, 1991 [DE] Germany ............. 9110236[U]

[51] Int. Cl.⁵ ................................ B65D 45/16
[52] U.S. Cl. ....................... 220/325; 220/326; 411/552; 24/596
[58] Field of Search ............ 220/3.8, 325, 326; 411/337, 338, 349, 350, 549, 552; 24/596

[56] References Cited

U.S. PATENT DOCUMENTS 3,480,311 11/1969 Lanham, Jr. ............ 411/338 X
4,442,571 4/1984 Davis et al. ............. 411/552
4,657,462 4/1987 Hoen ..................... 411/552

*Primary Examiner*—Allan N. Shoap
*Assistant Examiner*—Nova Stucker
*Attorney, Agent, or Firm*—Henry M. Feiereisen

[57] ABSTRACT

A terminal box includes a base and a cover detachably securable to the base. The cover is provided with a stepped bore in each corner area thereof, with a spring-loaded locking bolt being insertable therein and slideable in axial direction in opposition to the spring action for securing the cover to the base. Each locking bolt has one end provided with a blade-like expansion which is created through flattening this respective end of the locking bolt. In the area facing the base, the cover is provided with radial slots which are in alignment with radial slots of the base and suitably dimensioned to receive the blade of the locking bolts. When placing the cover upon the base, each locking bolt is pressed down through the bore and radial slots in the base and turned to allow the blade of each locking bolt to bear upon an abutment of the base for securement of the cover to the base.

15 Claims, 4 Drawing Sheets

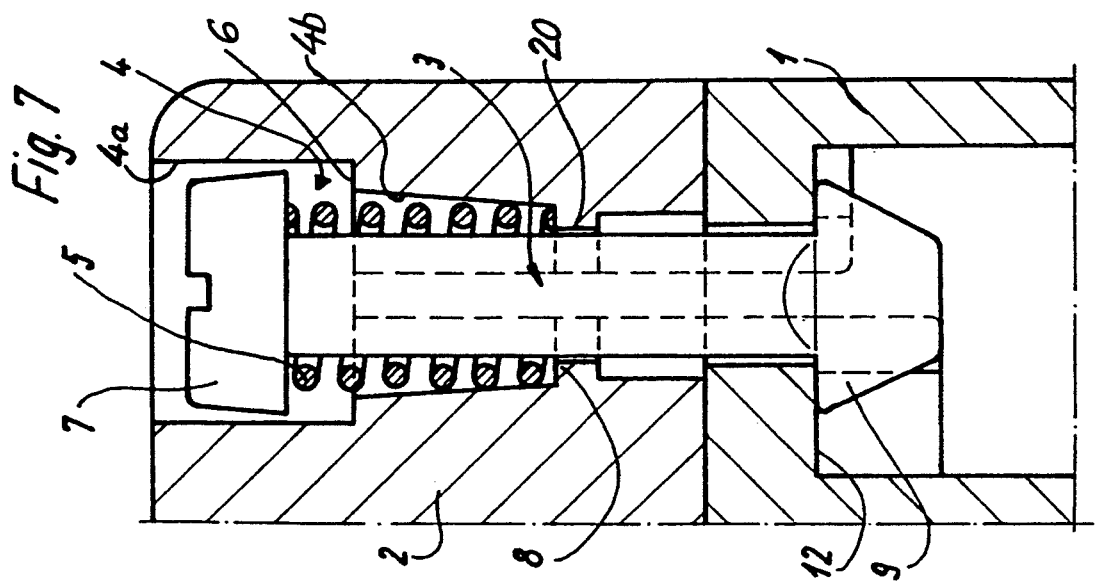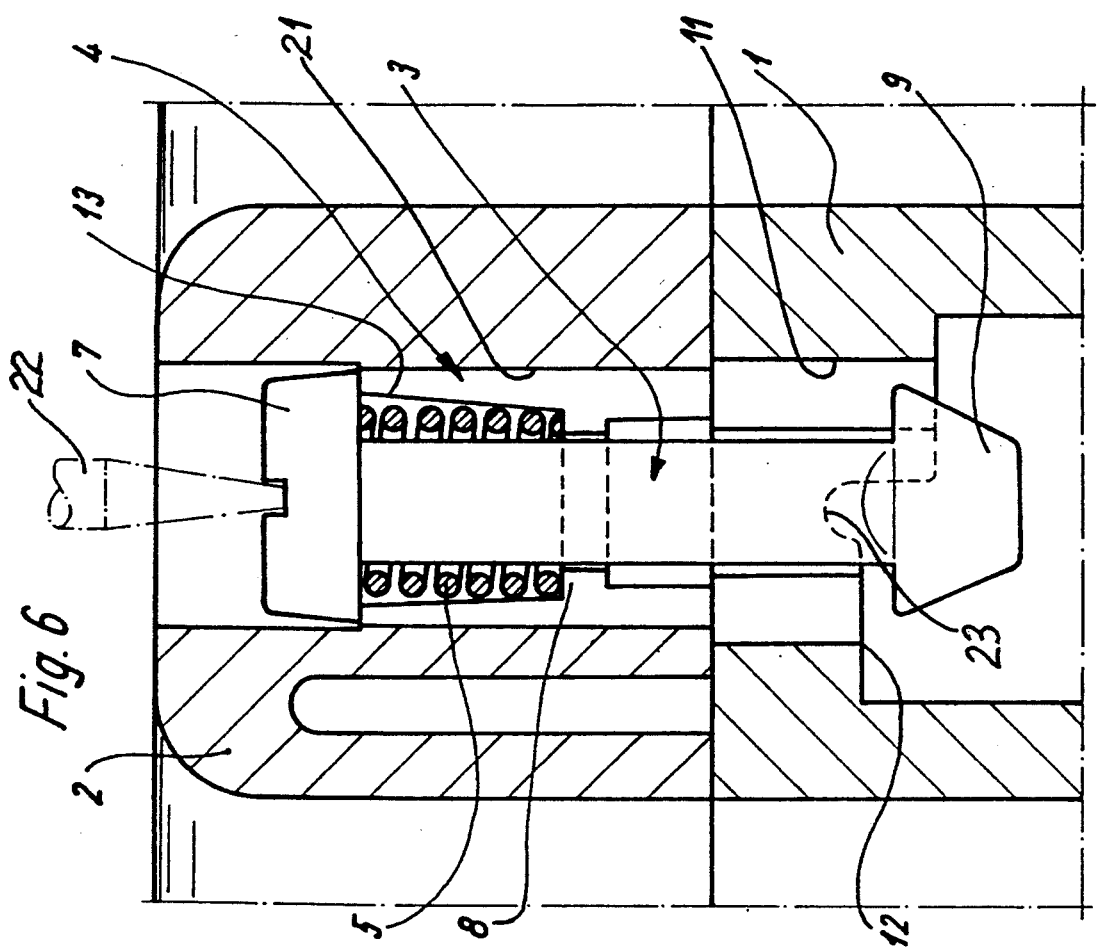

TERMINAL BOX

BACKGROUND OF THE INVENTION

The present invention refers to a terminal box, and in particular to a terminal box of the type including a base and a cover which is detachably securable to the base.

German utility model DE-GM 79 04 441 discloses a terminal box of this type, with the cover being provided with a circumferential groove which accommodates a seal and is engaged by a projecting edge of the base. The corners of the cover are provided with a stepped bore which is traversed by a spring-loaded locking bolt slideable in axial direction in opposition to the action of the spring. At its head-distant end which faces the base, the locking bolt is provided with a cross pin which during insertion of the locking bolt to secure the cover to the base is guided through radial slots in the base and, after suitably turning the locking bolt, bears against an abutment of the base.

Even though a locking mechanism of this type permits the cover to be secured to the base in a relatively fast manner and also renders opening of the terminal box relatively simple, the insertion of the cross pin into the head-distant ends of the bolts is relatively complicated. Moreover, a removal of the locking bolts from the cover is only possible after squeezing or pushing out the cross pins from the end of each locking bolt.

SUMMARY OF THE INVENTION

It is thus an object of the present invention to provide an improved terminal box obviating the afore-stated drawbacks.

In particular, it is an object of the present invention to provide an improved terminal box which allows a simplified insertion and removal of the locking bolts into and from the stepped bores of the cover.

These objects and others which will become apparent hereinafter are attained in accordance with the present invention by providing the cover with radial slots in alignment with the radial slots of the base and by providing each locking bolt with a blade-like expansion through flattening the respective bolt end thereof.

In this manner, the manufacture and assembly of the locking bolts are considerably simplified since the locking bolts constitute only one single part which can easily and rapidly be inserted into or removed from the stepped bores via the aligned radial slots. This quick and simple placement of the locking bolts also conveniently allows their substitution with clamping screws in the event an increased sealing effect of the terminal box is desired.

Each locking bolt can be completely prefabricated together with its spring which initially is slid over the shank of the locking bolt, with the free end of the bolt being subsequently flattened to provide the blade-like expansion of the bolt end and to securely retain the spring on the locking bolt. Thereafter, the locking bolts are inserted into the respective stepped bores of the cover such that the spring of each locking bolt extends between its head and an abutment provided in the stepped bore of the cover. Suitably, each stepped bore may be provided with a flared bore section, which has a smallest diameter being slightly smaller than the outer diameter of the spring so that the spring of each locking bolt becomes jammed inside the stepped bore to securely retain the locking bolts within the cover.

BRIEF DESCRIPTION OF THE DRAWING

The above and other objects, features and advantages of the present invention will now be described in more detail with reference to the accompanying drawing in which:

FIG. 6 is a partial sectional view of the terminal box taken along the line VI—VI in FIG. 1, with the cover being placed upon the base and illustrating a depressed locking bolt occupying an intermediate position;

FIG. 7 is a partially sectional view of the terminal box with the locking bolt being turned by 90° to occupy its locking position.

DETAILED DESCRIPTION OF PREFERRED EMBODIMENTS

Figure 1:
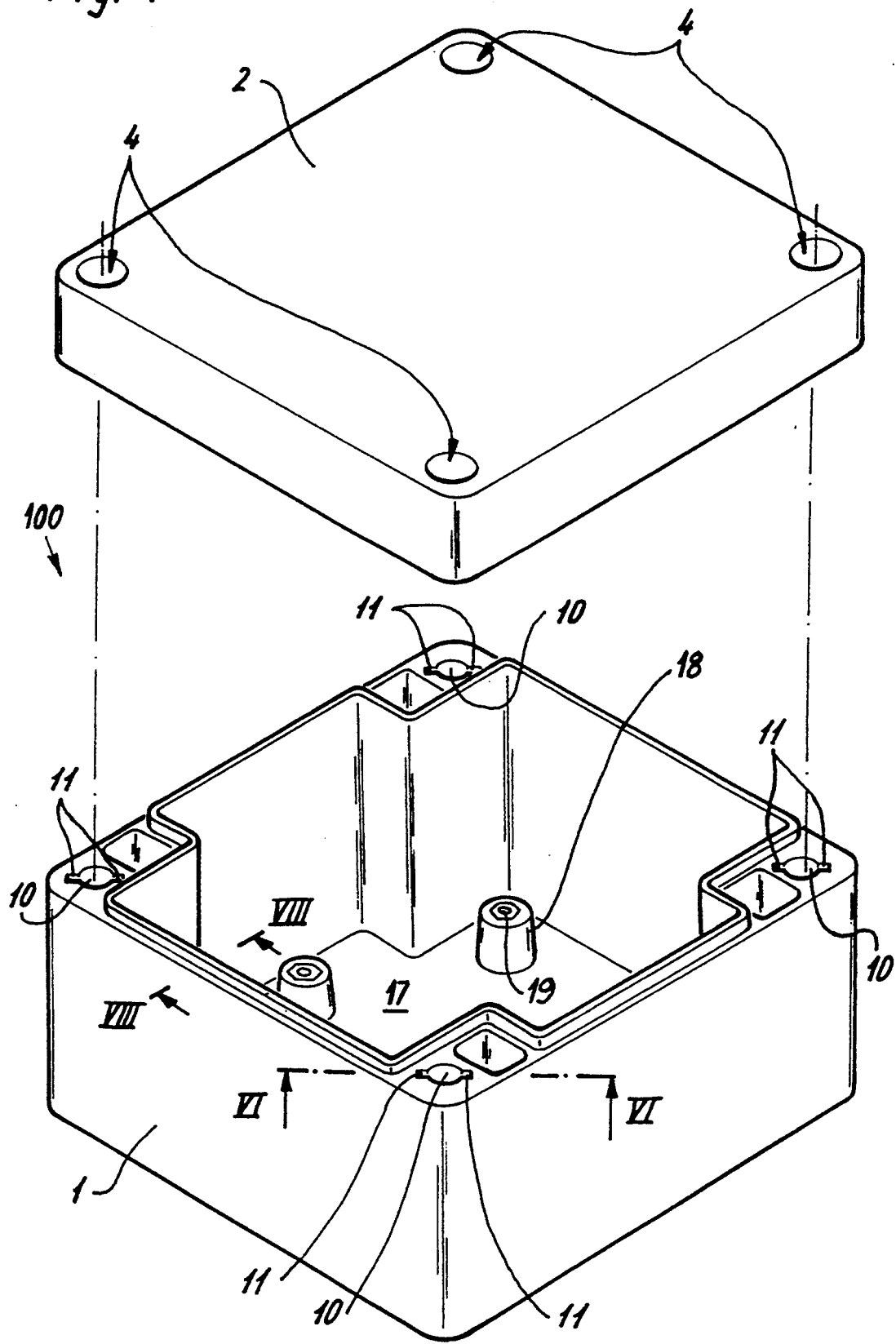
FIG. 1 is an exploded perspective illustration of one embodiment of a terminal box according to the invention, showing a base with detached cover.

Throughout all the Figures, the same or corresponding elements are always indicated by the same reference numerals.

Referring now to the drawings and in particular to FIG. 1, there is shown an exploded perspective illustration of a terminal box generally designated by reference numeral 100. The terminal box 100 includes a base 1 of generally rectangular or square configuration and a cover 2 which is of complementary configuration and detachably securable to the base 1. Both, base 1 and cover 2 may be made of plastic material as well as of metal.

Figure 2:
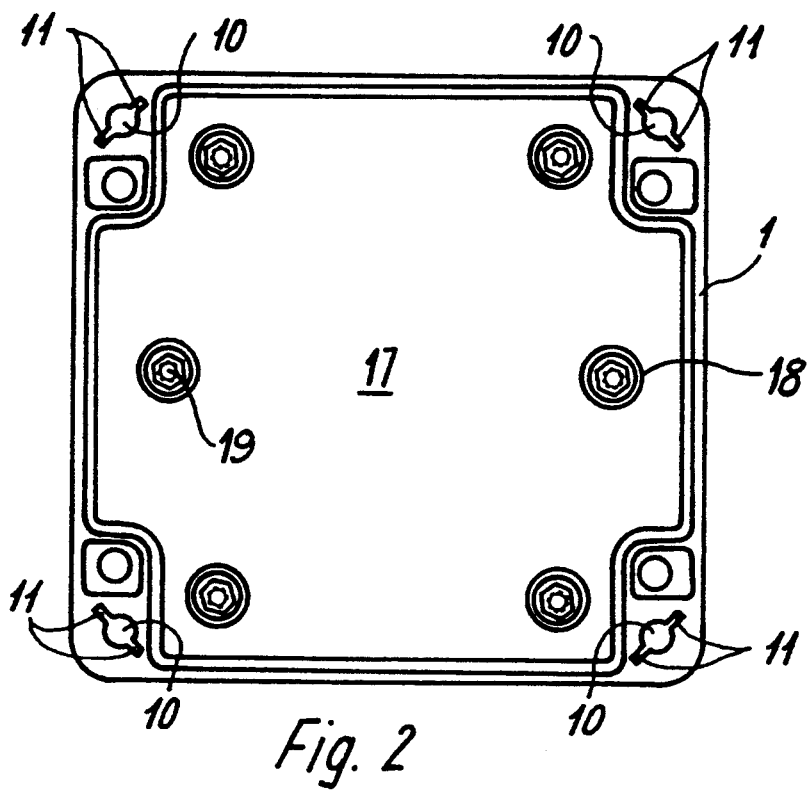
FIG. 2 is a top view of the base of the terminal box.

The base 1 has a bottom 17 which supports a plurality of mounts 18. As shown in particular in FIG. 2, the mounts 18 are generally arranged in the corners of the base 1 and in a central area between two respective mounts 18 to have e.g. a total of six mounts 18. Each mount 18 is provided with a hexagon socket 19 for attachment of suitable parts or devices.

Figure 4:
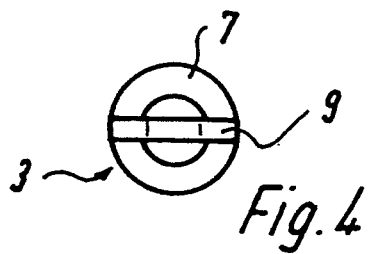
FIG. 4 is a plan view of the locking bolt in direction of arrow IV in FIG. 3.
Figure 3:
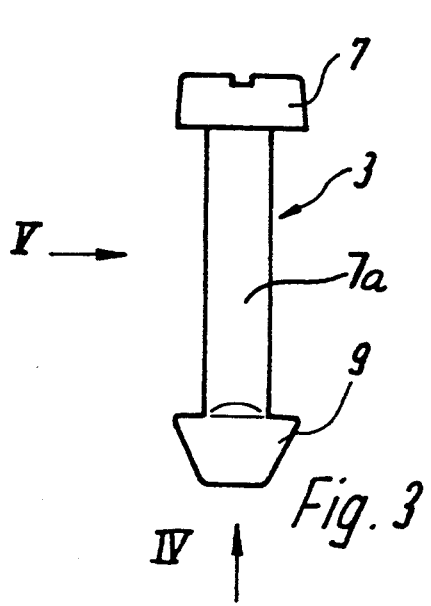
FIG. 3 is an illustration of a locking bolt for securing the cover to the base.
Figure 5:
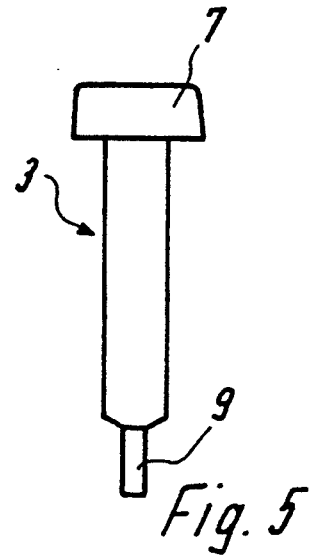
FIG. 5 is a side view of the locking bolt in direction of the arrow V in FIG. 3.

Each corner area of the cover 2 is provided with a stepped bore which is generally designated by reference numeral 4 and adapted for receiving a locking or fastening bolt, generally designated by reference numeral 3 and illustrated in detail in FIGS. 3–5. In alignment with each stepped bore 4 of the cover 2, the base 1 is provided with a bore 10 with radial slots 11 to allow passage of the locking bolts 3 in a manner to be described furtherbelow.

Turning now to FIGS. 3–5, it can be seen that each locking bolt 3 is provided with a slotted head 7 and a straight shank 7a. The head-distant or free end of the shank 7a is provided with a blade-like expansion 9 through suitably flattening the head-distant end of the shank 7a.

As best illustrated in FIG. 7, which is a partially sectional view of the terminal box 100, the stepped bore 4 of the cover 2 includes an upper generally cylindrical section 4a of constant diameter and a bore section 4b which is recessed relative to the bore section 4a and tapers in direction of the base 1. At the junction between the bore section 4a and the bore section 4b is a shoulder 6 for receiving the head 7 to limit the downward movement of the locking bolt 3. The tapered bore section 4b is followed by a bore section of smaller cross section which is defined by an inwardly directed projection 20 of the cover 2. The projection 20 provides an abutment 8 for one end of a spring 5 which surrounds the shank 7a of the locking bolt 3 and bears with its other end upon the inside surface of the head 7 to exert an upward force upon the locking bolt 3.

As indicated in FIG. 6, the cover 2 is provided along the inner bore sections of the stepped bore 4 with radial slots 21 which are in alignment with the radial slots 11 of the base 1. Thus, when securing the cover 2 to the base 1, each locking bolt 3 is pushed downwards by a suitable tool 22 (indicated in dash-dot line in FIG. 6) in opposition to the force exerted by the spring 5 through the aligned bores 4 and 10, with the blade 9 of each locking bolt 3 travelling through the aligned radial slots 21 and 11 in cover 2 and base 1, respectively, until reaching an intermediate position as shown in FIG. 6. The downward movement of the locking bolts 3 is restricted by the abutment of the head 7 upon the shoulder 6. Thereafter, each locking bolt 3 is slightly turned, for example by 90°, so that the blades 9 are moved away from the radial slots 11 of the base 1. Upon release of the spring 5 through removal of tool 22, the blade 9 of each locking bolt 3 is moved upwards by the force of the spring 5 until bearing upon an inner abutment 12 of the base 1 and securely fastening the cover 2 to the base 1, as shown in FIG. 7.

An unintended turning and release of the locking bolt 3 are prevented by providing the abutment 12 with an indentation 23 which is engaged by the blade 9 of the locking bolt 3 when occupying the locking position as shown in FIG. 7.

Detachment of the cover 2 from the base 1 is simply carried out by turning each locking bolt 3 to bring the blade 9 again in alignment with the slots 11 of the base 1 and the radial slots 21 of the cover 2.

Suitably, the bore section 4b, which is flared in direction of the head 7, has in proximity of the abutment 8 a smallest diameter which is smaller than the outer diameter of the spring 5. In this manner, the spring 5 is clamped or jammed when being pushed into the flared bore section 4b of the stepped bore 4 and captivates the locking bolt 3 in the cover 2. Through application of a suitable force, the clamping action of the spring 5 within the stepped bore 4 can be released if it is desired to remove the locking bolt 3 together with spring 5 from the stepped bore 4.

At detached cover 2, the blade 9 of each locking bolt 3 is situated in the radial slots 21 of the cover 2 so that the locking bolts 3 are secured against rotation and occupy a position in which they are always ready for instant fastening of the cover 2 to the base 1 while being securely retained in the cover 2 by the clamping action of their spring 5 in the stepped bore 4.

Attachment or detachment of the cover 2 to and from the base 1 can thus simply be accomplished by inserting or removing the locking bolts 3 into or from the aligned bores 4 and 10 and requires neither special tools nor special devices.

Figure 8:
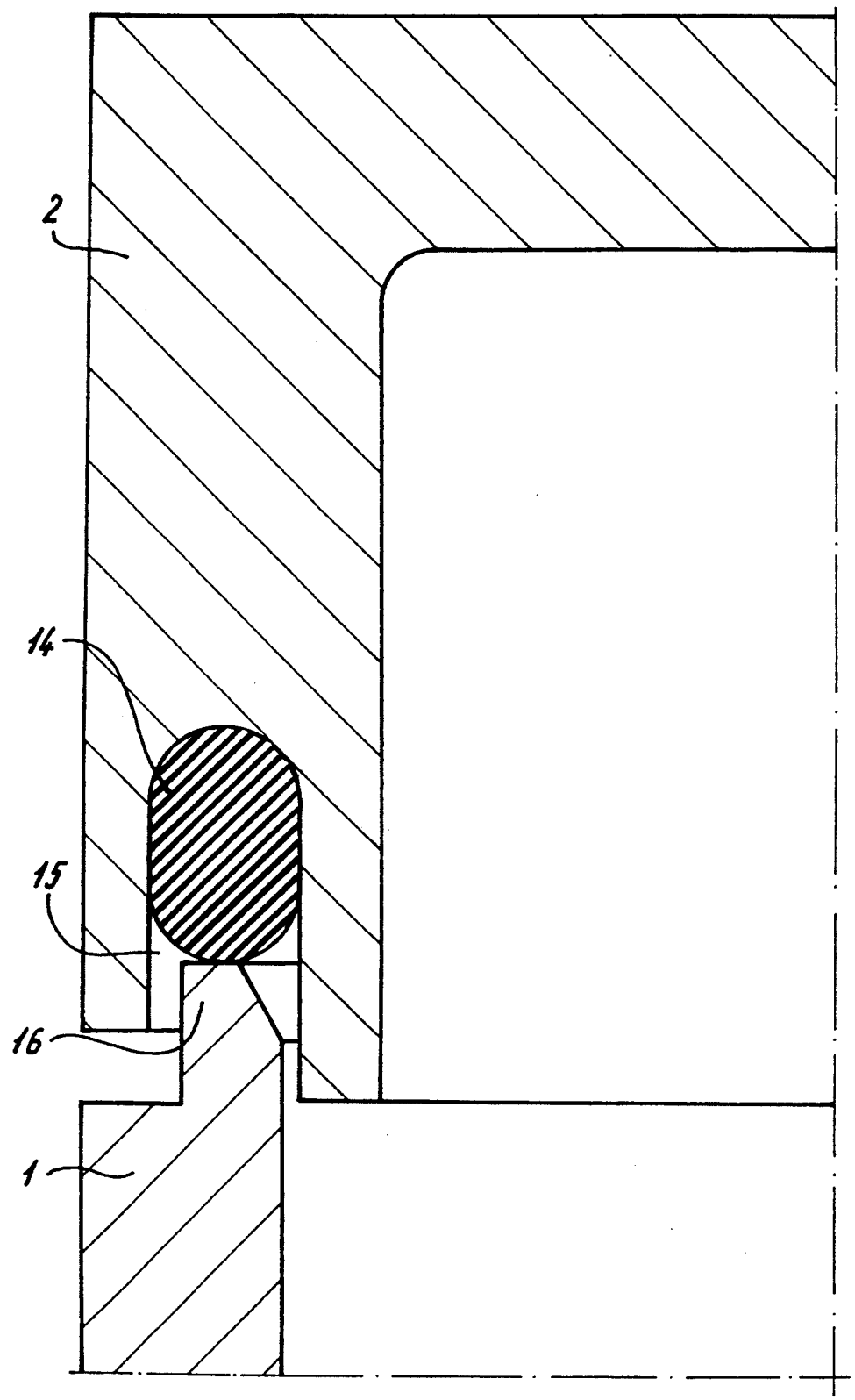
FIG. 8 is a partial sectional view of the terminal box taken along the line VIII—VIII in FIG. 1, with the cover being placed upon the base.

Turning now to FIG. 8 which illustrates a partial sectional view taken along the line VIII—VIII in FIG. 1, it can be seen that the cover 2 is provided with a circumferential groove 15 which accommodates a seal 14 of generally oval-shaped configuration and is engaged by a projecting edge 16 of the base 1 when the cover 2 is secured to the base 1. Suitably, the projecting edge 16 is slanted at its inner side to facilitate insertion of the edge 16 into the groove 15.

When securing the cover 2 to the base 1, the spring 5 of each locking bolt 3 exerts a predetermined force for pressing the cover 2 upon the base 1. The force by the springs 5 effects also a deformation of the seal 14 to attain a proper sealing action of the parting line between base 1 and cover 2.

If it is desired to further increase the sealing action by providing higher locking forces, the locking bolts 3 may be substituted with clamping screws (not shown). Removal of the locking bolts 3 from the cover 2 can easily be carried out through application of a suitable force to overcome the clamping action of the springs 5 within the stepped bores 4.

When the locking bolts 3 are removed from the cover 2, e.g. for substitution of the locking bolts with clamping screws, the blades 9 ensure that the springs 5 remain securely attached upon the shank 7a of the locking bolt 3, i.e. after placing the spring 5 upon the shank 7a and flattening the head-distant end of the locking bolt 3, the spring 5 cannot be removed from the shank 7a.

While the invention has been illustrated and described as embodied in a terminal box, it is not intended to be limited to the details shown since various modifications and structural changes may be made without departing in any way from the spirit of the present invention.

What is claimed as new and desired to be protected by Letters Patent is set forth in the appended claims:

1. A terminal box; comprising:
   a base having an upper projecting edge and including a bore provided with radial slots;
   a cover detachably securable to said base and including a circumferential groove for engagement by said projecting edge of said base, said cover having a stepped bore in a corner area thereof with radial slots in alignment with said radial slots of said bore of said base; and
   a spring-loaded fastener comprising a cylindrical shank having a diameter and a substantially flat blade-like extension of a thickness less than the diameter of said shank formed by flattening said one end of said fastener, said fastener being insertable in said stepped bore of said cover and displaceable in axial direction to bear upon an abutment of said base for detachably securing said cover to said base.

2. A terminal box as defined in claim 1 wherein said base is made of plastic material.

3. A terminal box as defined in claim 1 wherein said cover is made of plastic material.

4. A terminal box as defined in claim 1 wherein said base is made of metal.

5. A terminal box as defined in claim 1 wherein said cover is made of metal.

6. A terminal box as defined in claim 1 wherein said fastener includes a locking bolt having a head and a shank surrounded by a spring, with said spring extending between said head and an abutment in said stepped bore of said cover.

7. A terminal box as defined in claim 6 wherein said cover has a top surface, said stepped bore having a bore section flaring from said abutment toward the top surface of said cover, with said bore section having a smallest diameter and said spring having an outer diameter, wherein the smallest diameter of said bore section is slightly smaller than the outer diameter of said spring.

8. A housing; comprising:
a base including a bore provided with radial slots;
a cover having a stepped bore with radial slots in alignment with said bore and radial slots of said base; and
a spring-loaded fastener comprising a cylindrical shank having a diameter and a substantially flat blade-like extension of a thickness less than the diameter of said shank, said fastener being insertable in said stepped bore of said cover and displaceable in axial direction through said bore and radial slots of said base to bear upon an abutment of said base for detachably securing said cover to said base.

9. A housing as defined in claim 8 wherein said blade-like expansion is a flattening of said one end of said fastener.

10. A housing as defined in claim 8 wherein said base is made of plastic material.

11. A housing as defined in claim 8 wherein said cover is made of plastic material.

12. A terminal box as defined in claim 8 wherein said base is made of metal.

13. A terminal box as defined in claim 8 wherein said cover is made of metal.

14. A housing as defined in claim 8 wherein said stepped bore has a first bore section tapering toward said base and a second bore section following said first bore section in direction of said base and being of reduced diameter to define an abutment, said fastener being a locking bolt having a head and a shank surrounded by a spring which extends between said head and said abutment in said stepped bore of said cover.

15. A housing as defined in claim 14 wherein said cover has a top surface, said first bore section having a smallest diameter and said spring having an outer diameter, wherein the smallest diameter of said bore section is slightly smaller than the outer diameter of said spring.

* * * * *